INVENTOR.
SAUL MEYER

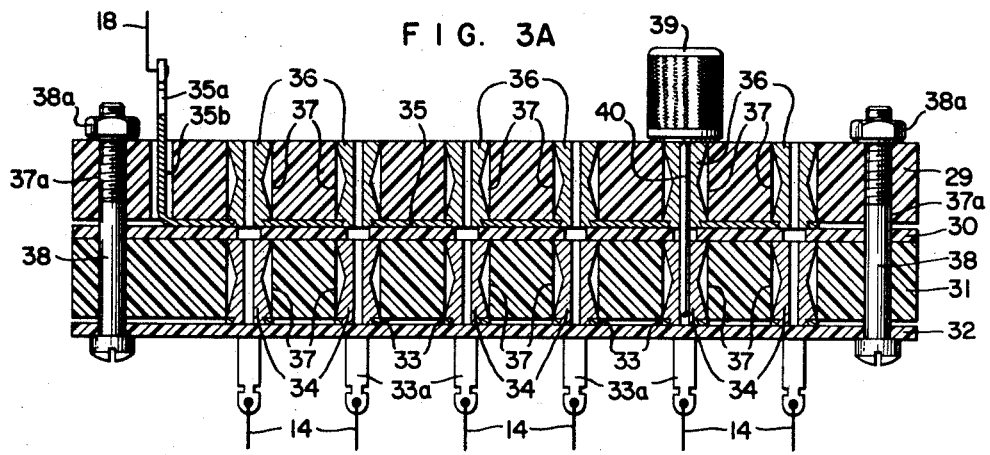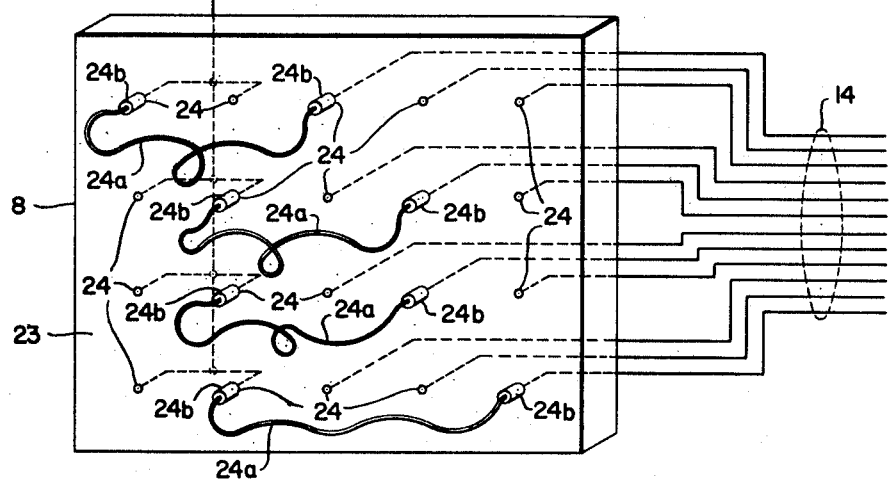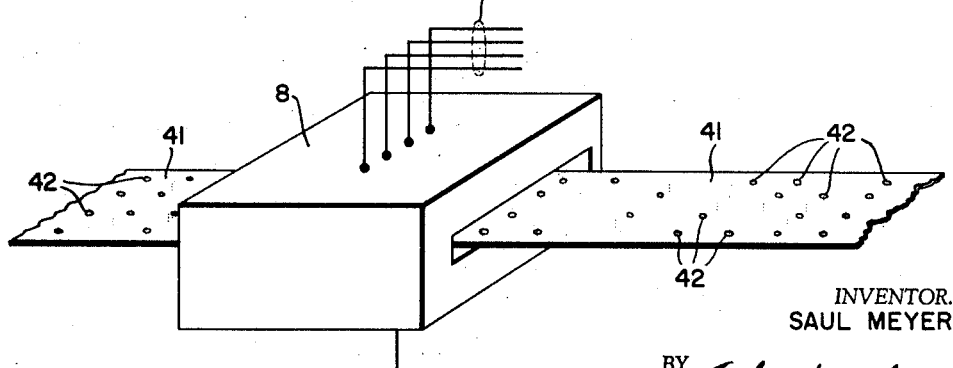

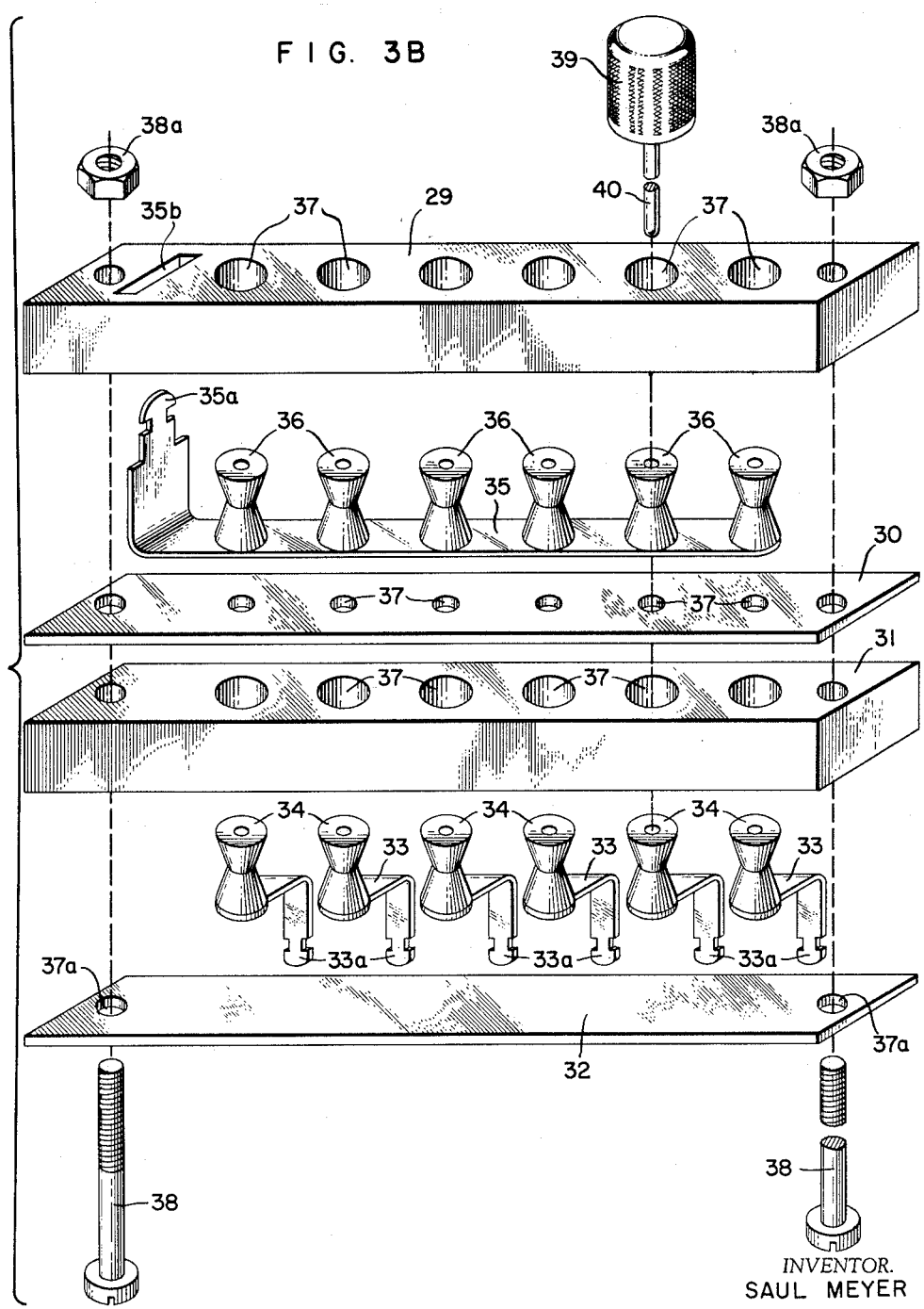

INVENTOR.
SAUL MEYER
BY Arthur H. Swanson
ATTORNEY.

Dec. 29, 1964 S. MEYER 3,163,849
ALARM SENSING
Filed April 21, 1958 5 Sheets-Sheet 5

INVENTOR.
SAUL MEYER
BY Arthur H. Swanson
ATTORNEY.

United States Patent Office 3,163,849
Patented Dec. 29, 1964

3,163,849
ALARM SENSING
Saul Meyer, Havertown, Del., assignor to Honeywell Inc., a corporation of Delaware
Filed Apr. 21, 1958, Ser. No. 729,961
18 Claims. (Cl. 340—146.2)

This invention relates to electrical measuring apparatus. More specifically, the present invention relates to a voltage-measuring and alarm system.

An object of the present invention is to provide, in combination with a voltage digitizing device, an alarm system which responds to abnormal values of input signals without interfering with the rapid and accurate digitizing of said input signals by said voltage digitizing device.

The voltage measuring devices used in transducer scanning systems frequently employ some means for converting the analog input signals received from each of a plurality of monitoring transducers into suitable digital values. On occasion, it is desirable to be alerted to abnormalities in the input signal level. The sensing of the abnormal values of the input signals has heretofore either not been included in the design of the voltage-measuring system, or the abnormal signal sensing equipment has been actuated by the input signal. In order to obtain a more useful record of the scanned signals from the several transducers, it is desirable to provide means whereby signals of abnormal value actuate an alarm device which would indicate the occurrence of such an abnormal signal. It has usually been found that using the input transducers for alarm purposes increases the complexity and reduces the reliability and sensitivity of the monitoring equipment. The accuracy of the transducers and/or measuring instrument should not be adversely affected by the digitizing and recording of the input signal notwithstanding the fact that the input signal may be of such a value as to actuate the alarm apparatus.

It is, accordingly, an object of the present invention to provide an improved apparatus for overcoming the aforementioned disadvantages of the prior abnormal-value sensing devices.

Another object of the present invention is to provide an improved alarm system capable of responding to transient abnormal signals.

Still another object of the present invention is to provide an improved alarm system which uses the digitizing circuits of a digital voltage measuring device.

Still another object of the present invention is to provide an improved alarm system, as set forth, including means for translating signals of one pattern into signals of a different pattern suitable for a co-operating voltage measuring device.

A further object of the present invention is to provide an improved alarm system which uses an external control for the digitizing circuits of the voltage measuring device which control is presettable according to a digital code.

A further object of the present invention is to provide an improved external control for an alarm system having utility with a voltage digitizing device, which control is characterized by selectively alterable external connections.

Another further object of the present invention is to provide an improved external control for an alarm system having utility with a voltage digitizing device, which control is particularly suited for the alarm system and is characterized by simplified manual operation.

Another further object of the present invention is to provide an improved alarm system which will retain the accuracy of the voltage measuring device.

A still further object of the present invention is to provide an improved alarm system for a voltage measuring device, which alarm system is characterized by simplified operation and construction.

In accomplishing these and other objects, there has been provided, in accordance with the present invention, an external auxiliary control for a voltage digitizing device. The external control is used to establish a reference level signal which will deliver to a comparison circuit a voltage representative of a desired limit of a sampled input signal. After a digitizing cycle of the aforementioned voltage digitizing device, the primary control means of the digitizing device operates to energize the digitizing device through the external control means to develop said reference level signal. A comparison amplifier is used to compare the input signal to the present reference level signal and to actuate an alarm device, if the input signal exceeds the reference level signal.

A better understanding of the present invention may be had from the following detailed description when read in connection with the accompanying drawings, in which;

FIG. 2 is a representation of a pinboard control device for the alarm sensing and voltage measuring system shown in FIG. 1.

FIG. 3a is an assembled representation of another pinboard control device for the alarm sensing and voltage measuring system shown in FIG. 1.

FIG. 3b is an exploded representation of the control device shown in FIG. 3a.

FIG. 4 is a representation of another control device for the alarm sensing and voltage measuring system shown in FIG. 1.

Figure 1:
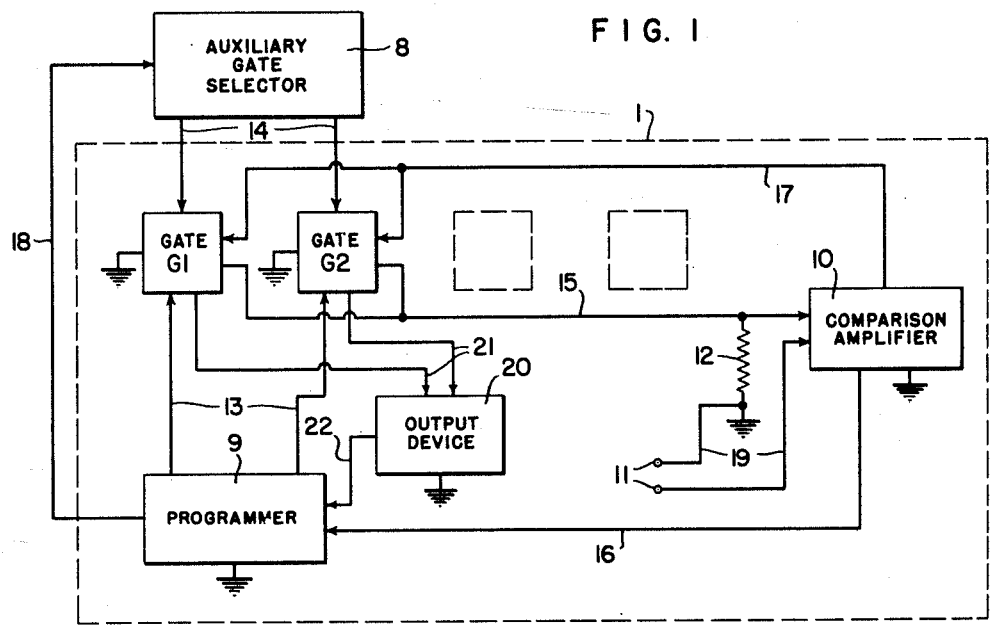
FIG. 1 is a schematic diagram of an alarm sensing and voltage measuring system embodying the present invention.

Referring to FIG. 1 in more detail, there is shown a typical comparison type voltage measuring system 1. A pair of input terminals 11 are provided for connection to the output voltage of the monitoring transducer. The voltage output may be a representation of temperature, flow, pressure or any other system variable which is capable of being sensed by a suitable transducer. The voltage supplied to the input terminals 11 is applied as one input signal to a comparison amplifier 10 through a pair of connecting leads 19.

The comparison amplifier 10 may be any one of many electronic devices used to compare two voltages and to determine whether one voltage exceeds the other; such devices being well-known in the art.

A second input signal to the comparison amplifier 10 is obtained from the combination of a plurality of incremental gates G1, G2, G3, etc., a programmer 9 and a comparison resistor 12. The incremental gates may be suitable electronic current-controlling circuits or simply current-controlling resistor and relay circuits determining the current through the comparison resistor 12. The programmer 9, which is the primary incremental gate control means, may be any suitable cyclically-controlled, sequentially operated mechanical or electronic device. An example of a suitable mechanical device is a stepping switch with a plurality of contacts controlled in a sequential fashion. The programmer 9 controls the sequential switching of the incremental gates by means of signals carried by primary gate control lines 13. The current increments controlled by the sequentially operated incremental gates produce, across the comparison resistor 12 a sequentially decreasing series of voltages with the current increment controlled by the first incremental gate G1 producing the highest voltage. The other voltages produced across the comparison resistor 12, by the incremental gate controlled currents, are applied as the second input signal to the comparison amplifier 10 where they are compared to the input signal supplied to the input terminals 11 by the minitoring transducer. If the input signal is larger than the voltage across the comparison resistor 12, the comparison amplifier 10 locks, in a closed condition, the incremental gate switched on by the programmer 9, prior to the comparison, to produce the test voltage across the comparison resistor 12. On the other hand the comparison amplifier 10 does not institute a lock-on operation for the incremental gate switched on prior to the comparison. At the end of each comparison, a signal from the comparison amplifier, fed along the control connection 16 to the programmer 9, enables the programmer 9 to switch off the incremental gate switched on prior to the comparison, if the comparison amplifier has not instituted a lock-on condition as explained previously, and to switch on the next sequential incremental gate. At the end of a complete digitizing cycle involving the sequential switching of all the incremental gates by the programmer 9, signals fed along the primary gate-control lines 13 from the programmer 9 override any lock-on condition of the incremental gates instituted during the previously explained digitizing cycle and thereby open all the incremental gates in preparation for a new cycle of operation.

An auxiliary gate control means 8 is provided for selecting a number of the incremental gates for simultaneous operation to establish a reference level signal which is representative of the upper limit for normal values of the input signals being sampled, hereinafter referred to as a reference signal, during a separate input signal comparison cycle. The energization of the auxiliary gate control means 8 is accomplished by signals from the grogrammer 9 fed along a connecting wire 18. The incremental gates which are simultaneously operated during the input signal comparison cycle control a voltage across the comparison resistor 12. The comparison of the voltage appearing across the comparison resistor 12, during the comparison cycle, with the input voltage from the monitoring transducer by the comparison amplifier 10 results in the actuation of an alarm means if the input voltage is greater than the reference signal appearing across the comparison resistor 12. After such a comparison cycle, the opening of the incremental gates is again accomplished by means of signals from the programmer 9, fed along the primary gate-control lines 13, as explained previously for the digitizing cycle. The complete mode of operation of the apparatus of the present invention follows.

Assuming the auxiliary gate selector 8 is to be energized at the end of the digitizing cycle and the incremental gates G1, G2, etc. are all open, or cleared, a typical voltage measuring and digitizing cycle would initiate with the programmer 9 closing the first incremental gate G1 by means of a signal applied to the appropriate primary gate-control line 13. Since the incremental gates are usually arranged with the first incremental gate controlling the highest test voltage, the comparison amplifier 10 initially compares the input signal voltage from the monitoring transducer with the high voltage, controlled by the first incremental gate G1, now appearing across the comparison resistor 12. If the test voltage across the comparison resistor 12 is higher than the input signal voltage, the comparison amplifier 12 signals the programmer, by means of a signal fed along the control line 16, to open the first gate G1 and to close the second incremental gate G2. If the voltage across the comparison resistor 12 is lower than the input signal voltage, the comparison amplifier 12 locks the first gate G1 in a closed condition by means of a signal fed along a gate-lock line 17 and also signals the programmer 9, by means of a signal fed along the control line 16, to close the second incremental gate G2. In either case, the programmer 9 closes the second incremental gate G2, which gate controls a second test voltage which is lower than the first test voltage controlled by the first incremental gate G1. Depending on the decision of the comparison amplifier 10, as explained above, the new test voltage now appearing across the comparison resistor 12 is either the sum of the test voltage of the locked first incremental gate G1 and the test voltage of the second incremental gate G2 or the single test voltage controlled by the second incremental gate G2. The new test voltage across the comparison resistor 12 is now compared by the comparison amplifier 10 to the input signal voltage. As in the first comparison, explained previously, the second incremental gate G2 is either locked in a closed condition by the comparison amplifier 10 or the programmer 9 is permitted to open the second incremental gate G2 at the end of the second comparison. In either case, the comparison amplifier 10 signals the programmer 9 to close the third incremental gate G3. The test voltage now appearing across the comparison resistor 12 is the sum of the voltage controlled by the third gate G3 and the incremental voltages remaining from any previously locked gates. The comparison operation of the comparison amplifier 10 is repeated for the third gate G3 and all succeeding gates G4, etc. in a manner as described above. The final test voltage across the comparison resistor 12 is the sum of the incremental voltages controlled by the incremental gates which have been locked in a closed condition by the comparison amplifier 10. The final condition of the incremental gates is sensed by an output device 20 along a plurality of sensing lines 21. The output device 20 signals the programmer 9 by means of a signal fed along the control line 22 to indicate the end of the sensing operation by the output device 20. The signal, from the output device 20, indicating the end of the sensing operation steps the programmer 9 to a new operating position, which position delivers a signal to the gate control lines 13 overriding any lock decisions of the comparison amplifier 10, instituted during the digitizing cycle and opening all the incremental gates. After the gate opening operation, described above, the programmer 9 automatically steps to a new position and energizes an auxiliary gate control line 18. The auxiliary gate selector 8, of the present invention, distributes the energization of the auxiliary gate control line 18 to a pre-selected number of the incremental gates along the signal-carrying wires 14. The signal distributed by the auxiliary gate selector simultaneously energizes the pre-selected incremental gates and a reference signal appears across the comparison resistor 12. The reference signal is the sum of the incremental voltages controlled by the simultaneously closed incremental gates. The comparison amplifier 10 now compares the reference signal across the comparison resistor 12 to the input signal voltage. If the comparison of the reference signal to the input signal voltage indicates the input signal voltage is higher than the reference signal, the comparison amplifier 10 signals a suitable alarm device. If the input signal voltage is lower than the reference signal, no alarm signal would be produced by the comparison amplifier 10. At the completion of the input signal comparison operation, the programmer 9 is signaled by the comparison amplifier to step to the next position and, as a result, automatically deenergize the auxiliary gate control line 18. The removal of the energization signal from the auxiliary gate control line 18 allows the incremental gates to simultaneously open since the comparison amplifier 10 did not institute any locking operation during the input signal comparison. The new position of the programmer 9 initiates a new digitizing cycle of the voltage-measuring device 1 as explained previously.

The auxiliary gate control 8 may be a pinboard device as shown in FIG. 2. A panel of electrically nonconductive material 23 has a number of pinjacks 24 mounted thereon with a first group of the pinjacks 24 representing the auxiliary gate control line 18. A second group of the pin jacks 24 represent individual connections to the incremental gates G1, G2, etc. by means of signal-carrying wires 14. The connections between the first group of the pinjacks 24 and a desired number of the second group of pinjacks may be made with pieces of wire 24a having pin plugs 24b on both ends thereof and having a suitable length for connecting the first and second group of pinjacks 24 to obtain the selected reference signal voltage for the comparison cycle described above.

Another form of structure with the auxiliary gate control 8 may assume is shown in FIGS. 3A and 3B. Strips of electrically insulating material 29, 30, 31, differing dimensionally only in thickness have similar holes 37 punched in similar places. Bolt holes 37A are provided in all four of the strips of insulating material 29, 30, 31, 32 in positions to receive a pair of common assembly bolts 38, as shown in FIG. 3A. A first plurality of conductive-metal pin connectors 36 are conductively attached to a common conductive-metal strip 35 and are spaced on the metal strip 35 to be in alignment with the similar holes 37 punched in the strips of insulating material 29, 30, 31. A terminal lug 35A is provided for the metal strip 35 as a means for attaching the auxiliary gate control line 18. A terminal lug hole 35b is provided in the top strip of insulating material 29 to allow the terminal lug 35a to project therethrough. A second plurality of conductive-metal pin connectors 34 are conductively attached to separate conductive-metal strips 33. A terminal lug 33 is provided for each of the metal strips 33 as a means for attaching to one of the auxiliary gate control lines 14. The first plurality of pin connectors 36 and the second plurality of pin connectors 34 are arranged in pairs with the number of pairs of pin connectors equal to the number of incremental gates in the voltage-digitizing device. An electrically conductive pin 40 is attached to an insulating cap 39 and will connect a pair of the pin connectors when inserted into the selected pair. The energization of the auxiliary control line 18 is distributed, during the comparison cycle, to the selected incremental gates by a plurality of the conducting pins 40 inserted in the selected pairs of pin connectors.

Another form of structure which the auxiliary gate control 8 may assume is shown in FIG. 4. An information-storage member 41 such as a tape or card containing inscribed information is sensed by an information sensor 8. The information contained on the storage member 41 may be in any of the forms well-known in the art, such as a series of groups of punched holes. The information sensor 8 may be any suitable device for sensing the information on the storage member 41, such devices being also well-known in the art. The energization of the control line 18 is distributed to the incremental gate control lines 14 according to the information on the storage member 41. The information on the storage member 41 produces a reference level signal for the comparison cycle.

Figure 5:
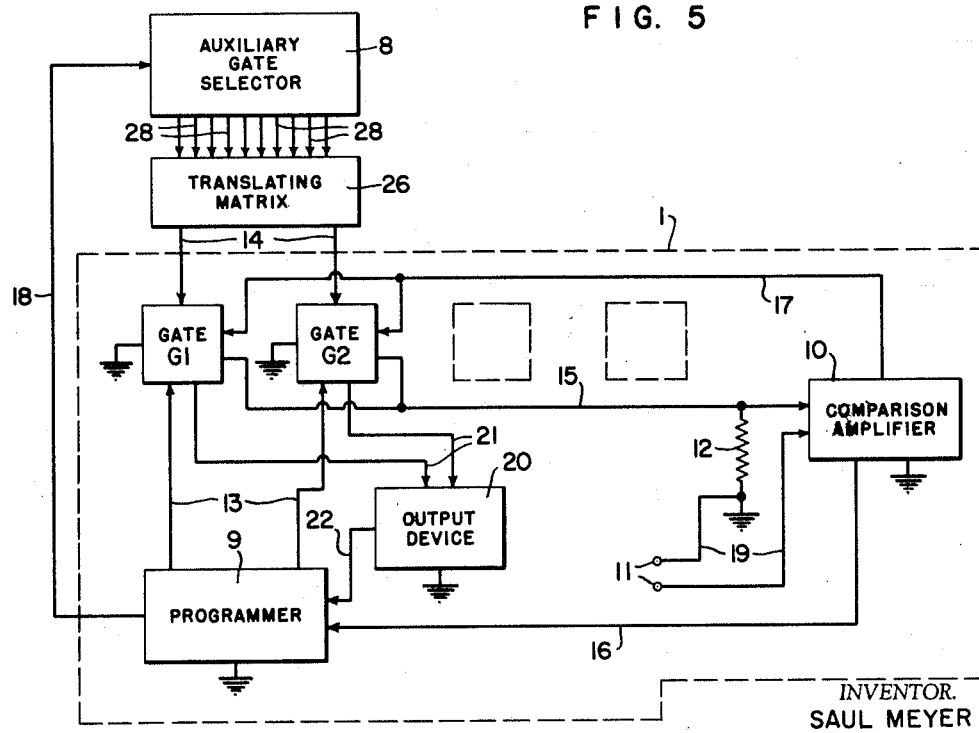
FIG. 5 is a schematic diagram of a somewhat different structure for an alarm sensing and voltage measuring system also embodying the present invention.
Figure 6:
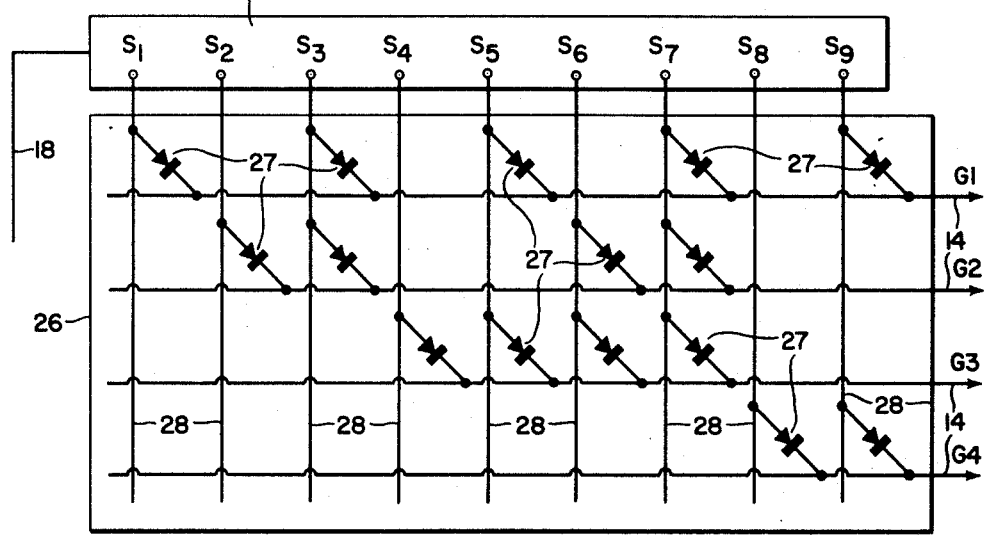
FIG. 6 is a representation of the translating matrix shown in FIG. 5.

In FIG. 5 there is shown a somewhat different structure for the embodiment of the invention. This structure corresponds substantially to FIG. 1 but includes the addition of a translating matrix 26. This matrix is shown schematically in greater detail in FIG. 6. The translating matrix 26 may be a device well-known in the art such as the matrix shown in FIGS. 13–40 on page 424 of "Pulse and Digital Circuits" by Millman and Taub, published in 1950 by McGraw-Hill. The digitizing device 1 shown in FIG. 5 operates during the digitizing and comparison cycles in a manner as described above in relation to the digitizing device 1 shown in FIG. 1. The incremental gates of the voltage digitizing device may be arranged in a code which requires the selection of a single gate or a combination of gates to obtain a selected reference signal voltage. The coded arrangement of the incremental gates, as herein illustrated, is different from the voltage selection code used in the auxiliary gate selector 8. The translating matrix 26 may operate in a manner explained in the above cited publication to translate the voltage selection in the code of the auxiliary gate selector 8 into the coded arrangement of the incremental gates. The incremental gate code for which the structure shown in FIG. 6 is adapted uses four incremental gates, selected by the translating matrix 26, either singly or in combination, to obtain the nine different reference signal voltage capable of being selected by the auxiliary gate selector 8. The function of the translating matrix 26 may be illustrated by a specific operation; e.g. the selection of the voltage numbered six in the auxiliary gate selector 8 is translated by the matrix 26 to the incremental gate code and the translation results in the simultaneous selection of the second incremental G2 and the third incremental gate G3. The translating matrix 26 may be used with any of the aforementioned embodiments of the auxiliary gate selector 8.

Figure 7:
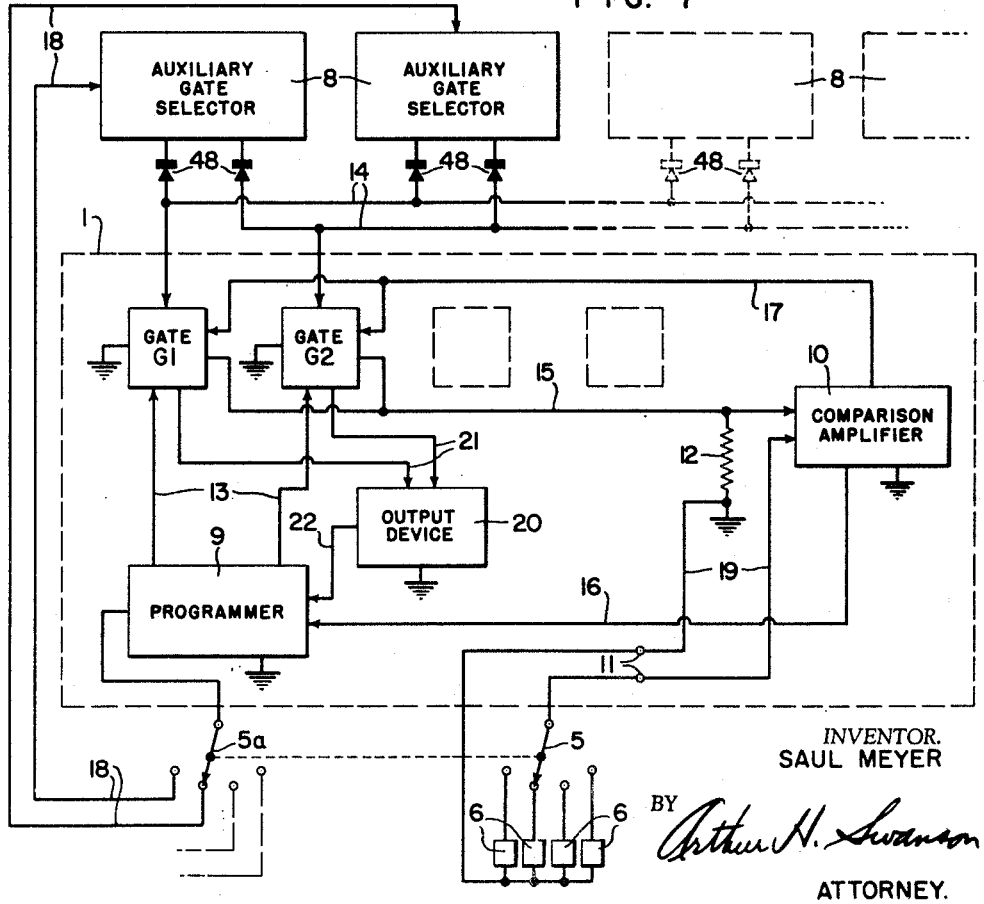
FIG. 7 is a schematic diagram of an alarm sensing and voltage measuring system embodying the present invention for use with multiple input signals.

The alarm system of the present invention may also be used with a voltage-measuring device which scans a plurality of input transducers as shown in FIG. 7. A plurality of input transducers 6 are sequentially connected to the digitizing device by an input selector 5. The input selector 5 may be a stepping switch similar to the type used in the programmer 9. The input transducers 6 may require either different or similar reference signal voltages. In FIG. 7, it may be seen that there are provided a plurality of auxiliary gate selector control lines 18 each connected to a corresponding one of a plurality of auxiliary gate selectors 8. Each of the auxiliary gate selectors 8 is substantially identical to the auxiliary gate selector 8 shown in FIG. 1. Isolating diodes 48 are used to prevent interaction among the auxiliary gate selectors 8. The number of control lines 18 as well as the number of corresponding gate selectors 8 is equal to the number of input transducers 6. The selection of the appropriate control line 18 is accomplished by a selector switch 5A acting in synchronization with the input selector switch 5. The control line selector switch 5A may be a stepping switch identical to the input selector switch 5.

Thus, each auxiliary gate selector 8 is energized during the comparison cycle, by a separate control line 18, which control line 18 is selected as explained above. In addition, each of the auxiliary gate selectors 8 is preset to produce an appropriate reference level voltage for the input transducer 6 selected simultaneously with the control line 18 of that auxiliary gate selector 8. The digitizing device shown in FIG. 7 operates, during the digitizing and comparison cycles, in a manner as described above with relation to the digitizing device 1 shown in FIG. 1 with the exception that the input selector 5 operates, between digitizing cycles, to select, in sequence, successive ones of the input transducers for connection to the digitizing device. The multiple-input alarm system may be used either with one of the aforementioned embodiments of the auxiliary gate selector 8 alone or with the translating matrix 26 and anyone of the embodiments of the auxiliary gate selector 8.

Figure 8:
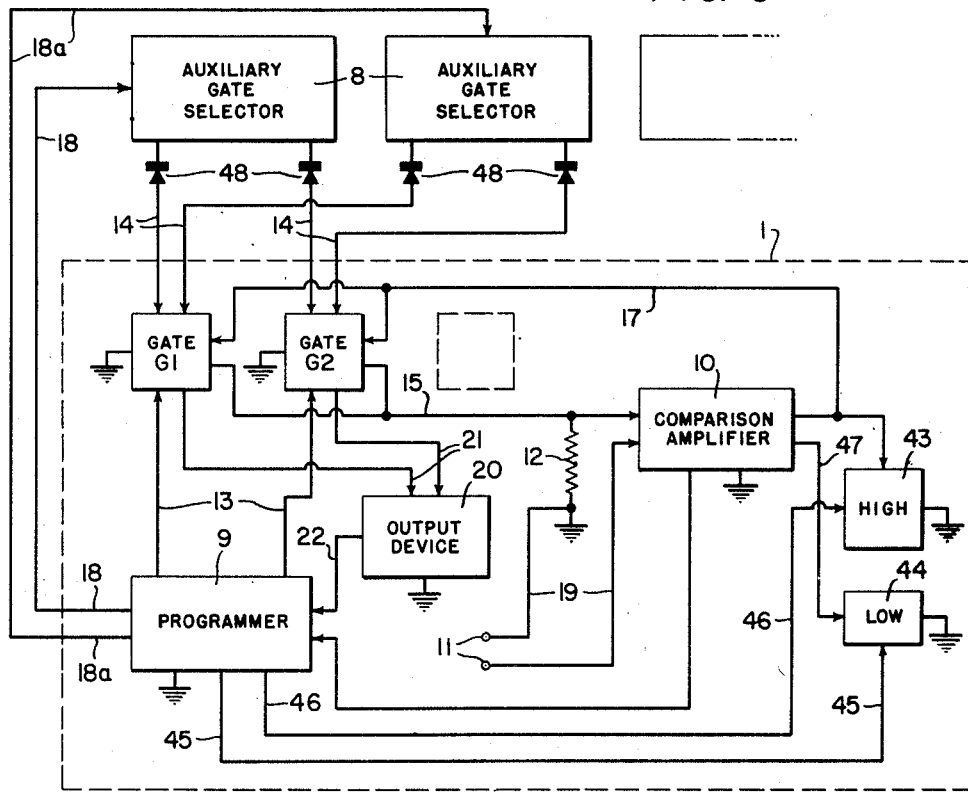
FIG. 8 is a schematic diagram of an alarm sensing and voltage measuring system embodying the present invention for use with high and low alarm sensing.

The alarm system of the present invention may also be used with a voltage-measuring device to sense a subnormality of the input signal, as well as the abnormality aforementioned, as shown in FIG. 8. The digitizing device shown in FIG. 8 operates, during the digitizing cycle, in a manner as described above in relation to the digitizing device shown in FIG. 1. The comparison cycle for the high and low alarm sensing comprises two separate successive comparisons. The programmer 9 successively energizes ones of a pair of auxiliary control lines 18, 18a.

In addition, the programmer 9 provides means for discriminating between the high alarm and the low alarm by energizing the proper alarm line of a pair of alarm lines 45, 46. The sensing of the abnormality of the input signal is performed as described above with the addition that a high alarm line 46 is simultaneously energized by the programmer 9 to allow only the operator of a high alarm 43 if the comparison indicates an abnormality. A low alarm output line 47 is used to feed an output signal to a low alarm indicator 44. The low alarm output line 47 carries a previously unused output signal of the comparison amplifier 10; i.e., the output signal resulting from a comparison in which the input signal is lower than the reference level signal. The sensing of the subnormality of the input signal is performed during a second comparison. The programmer 9 clears the incremental gates, as explained previously, and energizes a second gate control line 18a simultaneously with a low alarm line 2. The second auxiliary gate selector 8 is preset to produce a reference level signal representing the low limit of the input signal. If the comparison by the comparison amplifier 10 indicates that the input signal is lower than the reference level signal, the output signal fed along line 47 energizes the low alarm indicator 44 preselected by the low alarm line 45. The high and low alarm system may be used with any of the aforementioned embodiments of the auxiliary gate control 8 alone or in combination with the translating matrix 6.

The high and low alarm system may also be used with the aforementioned multiple-input system.

Subject matter disclosed but not claimed herein is disclosed and claimed in the copending divisional application of Saul Meyer, Serial No. 89,602, filed on January 30, 1961.

Thus, it may be seen that there has been provided, in accordance with the present invention, an alarm system for a voltage digitizing device using the digitizing circuits of the measuring device, which is characterized by the ability to respond to transient abnormalities and to prevent the introduction of any alarm system inaccuracies into the voltage digitizing device.

What is claimed is:

1. An alarm system for sensing abnormal values of a measured variable comprising an input signal digitizing device having incremental signal level gates, primary control means for sequentially actuating said gates, means for comparing incremental signals from said gates with signals representative of said measured variable to provide a digitized value corresponding to the value of said measured variable, auxiliary control means for establishing a reference level signal, said reference level signal being also compared with said signal representative of said measured variable by said comparing means to determine the presence or absence of an abnormality of said measured variable.

2. An alarm system as set forth in claim 1 wherein said auxiliary control means is controlled by an energizing signal from said input signal digitizing device.

3. An alarm system as set forth in claim 2 wherein said auxiliary control means simultaneously energizes a preselected number of said gates to establish said reference level signal.

4. An alarm system as set forth in claim 3 wherein said auxiliary control means comprises a first group of pinjacks, means providing a common connection for all of said pinjacks of said first group for connection to said energizing signal, a second group of pinjacks, means for supporting said first group of pinjacks and said second group of pinjacks in spaced relation with respect to each other providing a gap therebetween, means for connecting individual ones of said pinjacks of said second group separately to corresponding ones of said gates, and means for connecting individual ones of said pinjacks of said first group with individual ones of said pinjacks of said second group for selectively bridging said gaps.

5. An alarm system as set forth in claim 4 wherein said second group of pinjacks is arranged in accordance with a predetermined code and said gates are arranged in accordance with a second predetermined code differing from the first mentioned code, and wherein said system includes a translating means connected between said second group of pinjacks and said gates for translating signals corresponding to said first mentioned code to signals corresponding to said second mentioned code for application to said gates.

6. An alarm system as set forth in claim 5 wherein said translating means is a diode matrix.

7. An alarm system as set forth in claim 3 wherein said auxiliary control means comprises a first group of pin connectors, means providing a common connection for all of said pin connectors of said first group for connection to said energizing signal, a second group of pin connectors, means for supporting individual ones of said pin connectors of said first group substantially in axial alignment with corresponding individual ones of said pin connectors of said second group and separated by a gap therefrom, means for connecting individual ones of said connectors of said second group separately to corresponding ones of said gates, and means for connecting individual ones of said connectors of said first group to corresponding individual ones of said connectors of said second group for selectively bridging the gap therebetween.

8. An alarm system as set forth in claim 7 wherein said second group of pin connectors is arranged in accordance with a predetermined code and said gates are arranged in accordance with a second predetermined code differing from the first mentioned code, and wherein said system includes a translating means connected between said second group of pin connectors and said gates for translating signals corresponding to said first mentioned code to signals corresponding to said second mentioned code for application to said gates.

9. An alarm system as set forth in claim 8 wherein said translating means is a diode matrix.

10. An alarm system as set forth in claim 3 wherein said auxiliary control means comprises a record member having data signals recorded thereon, said data signals being representative of said reference level signal, cooperating sensing means for reading said data signals, and means responsive to said sensing means for actuating said gates to produce said reference level signal.

11. An alarm system as set forth in claim 3 wherein said auxiliary control means comprises a first gate selector for establishing a first reference level signal to determine the presence or absence of an abnormality, a second gate selector for establishing the presence or absence of a subnormality, means for successively energizing each of said gate selectors, and means for preventing interaction between said gate selectors.

12. An alarm system for sensing abnormal values of a measured variable comprising an input signal digitizing device having incremental signal level gates, primary control means for sequentially actuating said gates, means for comparing incremental signals from said gates with signals representative of said measured variable to provide a digitized value corresponding to the value of said measured variable, auxiliary control means for establishing a reference level signal, said reference level signal being compared with said signal representative of said measured variable by said comparing means, during intervals alternating with those in which said measured variable signals are compared to said incremental signals, to determine the presence or absence of an abnormality of said measured variable.

13. An alarm system for sensing abnormal values of a plurality of measured variables comprising an input signal digitizing device having incremental signal level gates, primary control means for sequentially actuating said gates, input signal selecting means for sequentially connecting signals representative of said measured variables to said input signal digitizing device, means for comparing incremental signals from said gates with said sequentially selected signals representative of said measured variables to provide digitized values corresponding to the values of said measured variables, and auxiliary control means for said gates for sequentially establishing reference level signals, said reference level signals being sequentially selected to correspond to said sequentially selected measured variables, corresponding ones of said reference level signals being compared by said comparison means with said input signals representative of said sequentially selected measured variables to determine the presence or absence of abnormalities of said measured variables.

14. An alarm system as set forth in claim 13 wherein said auxiliary control means is controlled by a plurality of energizing signals from said input signal digitizing device said energizing signals of said plurality of energizing signals being sequentially selected with corresponding ones of said sequentially selected measured variables.

15. An alarm system as set forth in claim 13 wherein said auxiliary control means simultaneously energizes sequentially preselected numbers of said gates to establish said reference level signals.

16. An alarm system as set forth in claim 14 wherein said auxiliary control means comprises a plurality of gate selectors, each of said gate selectors comprising a first group of pin connectors, means providing a common connection for all of said pin connectors of said first group for connection to a corresponding one of said energizing signals, a second group of pin connectors, means for supporting individual ones of said pin connectors of said first group substantially in axial alignment with corresponding individual ones of said pin connectors of said second group and spaced therefrom, means for connecting individual ones of said connectors of said second group separately to corresponding ones of said gates, isolating means included in said connecting means to prevent interaction among said gate selectors, means for connecting individual ones of said connectors of said first group to corresponding individual ones of said connectors of said second group for selectively bridging the space therebetween.

17. An alarm system as set forth in claim 16 wherein said second group of pin connectors of each of said gate selectors is arranged in accordance with a predetermined code and said gates are arranged in accordance with a second predetermined code differing from the first mentioned code, and wherein said system includes a translating means connected between said isolating means and said gates for translating signals corresponding to said first mentioned code to signals corresponding to said second code for application to said gates.

18. An alarm system as set forth in claim 17 wherein said translating means is a diode matrix.

References Cited in the file of this patent

UNITED STATES PATENTS

| | | |
|---|---|---|
| 2,407,176 | Piatt et al. | Sept. 3, 1946 |
| 2,736,889 | Kaiser et al. | Feb. 28, 1956 |
| 2,754,503 | Forbes | July 10, 1956 |
| 2,784,396 | Kaiser et al. | Mar. 5, 1957 |
| 2,802,189 | Bishop et al. | Aug. 6, 1957 |
| 2,901,739 | Freitas | Aug. 25, 1959 |
| 2,905,520 | Anderson | Sept. 22, 1959 |

OTHER REFERENCES

Electronics, February 1956, pp. 150–151 (by A. Strassman).